United States Patent [19]

Pitman

[11] Patent Number: 5,501,032
[45] Date of Patent: Mar. 26, 1996

[54] EXTERMINATION OF PUPATING INSECTS

[75] Inventor: Judith L. Pitman, San Diego, Calif.

[73] Assignee: FleaXperts, Inc., San Diego, Calif.

[21] Appl. No.: 251,081

[22] Filed: May 31, 1994

[51] Int. Cl.⁶ .................................................. A01M 19/00
[52] U.S. Cl. .......................... 43/129; 43/132.1; 43/125; 43/130; 43/900
[58] Field of Search ........................... 43/124, 125, 129, 43/130, 132.1, 900

[56] References Cited

U.S. PATENT DOCUMENTS

| | | | |
|---|---|---|---|
| 817,849 | 4/1906 | Hand | 43/130 |
| 1,259,230 | 3/1918 | Hanzadian | 43/130 |
| 1,513,137 | 10/1924 | Tarnok | 43/129 |
| 1,926,579 | 9/1933 | Burgess | 43/130 |
| 2,201,995 | 5/1940 | Erickson | 43/125 |
| 2,851,818 | 9/1958 | Matheny | 43/129 |
| 4,637,161 | 1/1987 | Turner | 43/130 |
| 4,756,118 | 7/1988 | Evans | 43/124 |
| 5,031,355 | 7/1991 | Ryan | 43/130 |
| 5,054,231 | 10/1991 | Witherspoon | 43/900 |
| 5,319,878 | 6/1994 | Moffett | 43/132.1 |

*Primary Examiner*—Kurt Rowan
*Attorney, Agent, or Firm*—Brown, Martin, Haller & McClain

[57] ABSTRACT

A method, compositions and apparatus are disclosed for causing the death of pupating insects, especially fleas, at all stages of the life cycle. The invention includes by both direct and residual insecticidal extermination of juveniles, adults, larvae and eggs, and also provides an environment of elevated humidity, temperature and pressure around pupal cocoons to cause the cocoons open quickly, so that the emergent insects are killed by residual insecticide, thus providing complete termination of an insect infestation and prevention of development of new infestations from subsequent emergence of metamorphosed insects from surviving pupa. Extermination occurs from the simultaneous application of a "residual" adulticide, a "residual" larvacide, and high temperature hot water under pressure to the infested location. The adulticides and larvacides may be inorganics, botanicals, organochlorides, organophosphates, carbamates, pyrethroids, growth inhibitors or chitin inhibitor compounds, and may be present with synergists, emulsifiers or surface active agents. Preferred materials are permethrin, methoprene and fenoxycarb. The apparatus used includes a hot water generator, a mixer to mix the hot water and insecticides, an applicator to force the hot water/insecticide mixture into the infested location, a conduit to deliver the hot water and insecticide mixture to the applicator, and pressure or a pump to maintain the flow of the hot water and insecticide mixture for the desired application period.

27 Claims, 1 Drawing Sheet

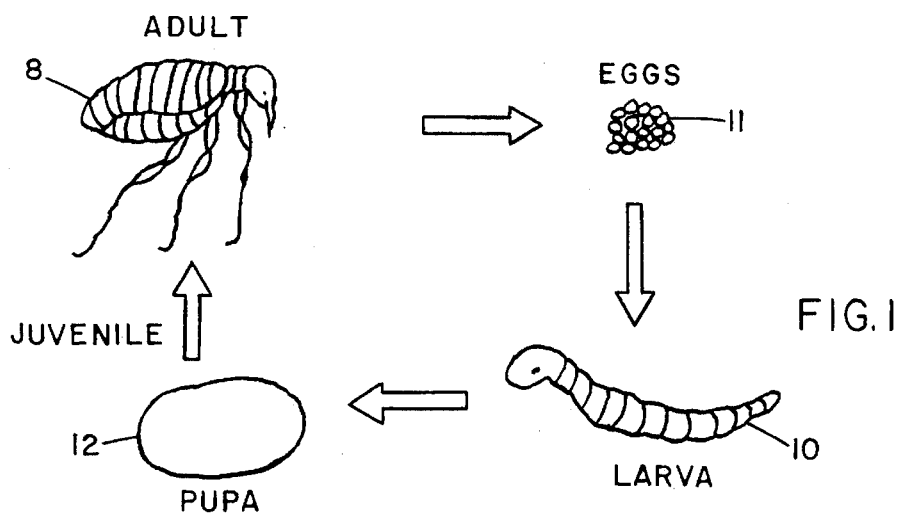
FIG. 1
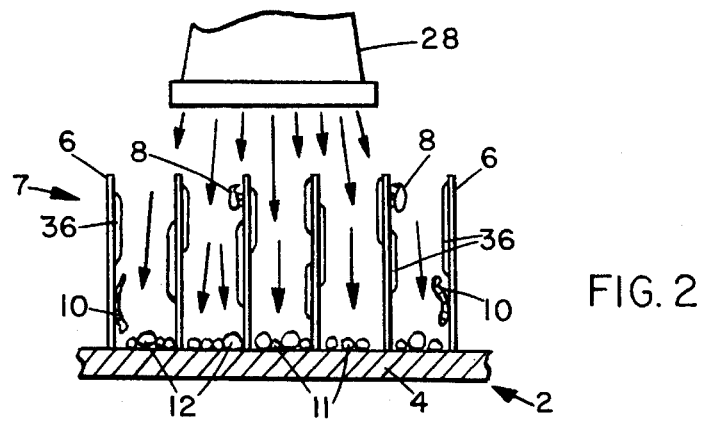
FIG. 2
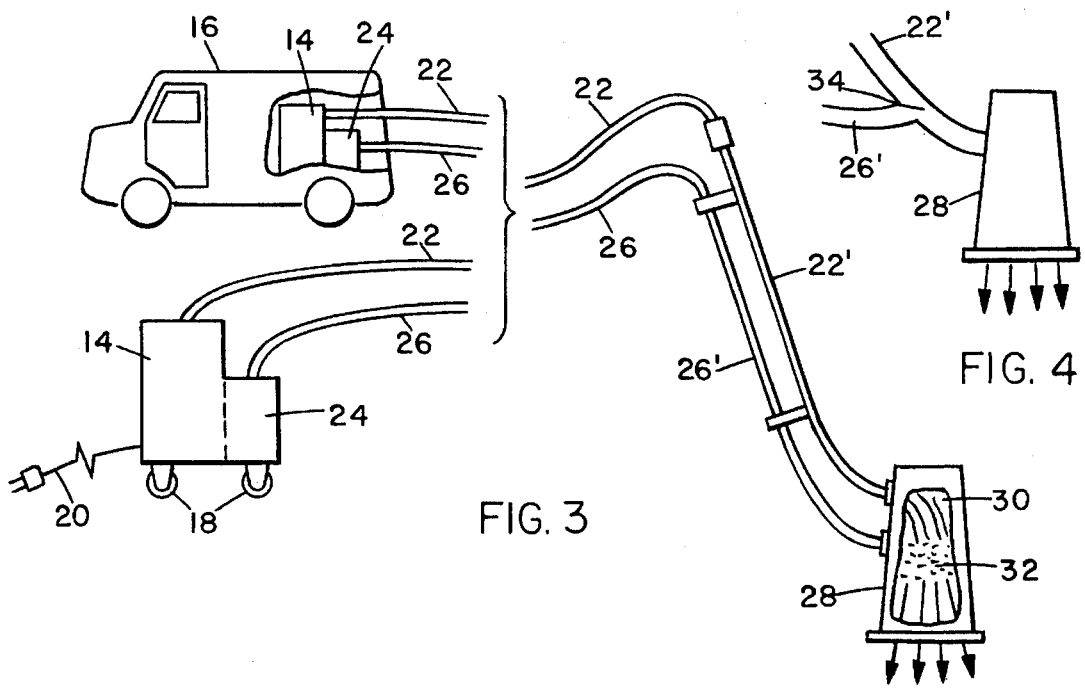
FIG. 3
FIG. 4

EXTERMINATION OF PUPATING INSECTS

BACKGROUND OF THE INVENTION

1. Field of the Invention

This invention relates to extermination of those species of insects whose life cycle includes a pupation stage.

2. Background of the Invention

Among the more troublesome insects for humans are the fleas (order Siphonaptera of the class Insecta). Humans, particularly in the western United States, suffer from bites of various rodent, rat and squirrel fleas of the genera Xenopsylla, Diamanus and Nosopsyllus, the first of which transmits the bacterium which causes bubonic plague. More commonly, however, humans are susceptible to the irritation caused by the bites of the human fleas (Genus Pulex) and the cat and dog fleas (*Ctenocephalides felis* and *C. canis*); Atkins, *Insects in Perspective*, pp. 481–483 (1978); Johnson et al., *Principles of Zoology*, pp. 444–445 (1977); Davies, "Insects" in *Larousse Encyclopedia of Animal Life*, p. 147 (1967);. Flea bites normally provoke an allergic reaction which may include reddish pimples, painful and weeping swellings and intensely itching rashes. Those persons who are particularly sensitive or allergic may suffer extremely severe reactions.

People who have dogs and cats as household pets are only too familiar with the problems that fleas cause. Fleas readily get into the fur of a pet and are carried into the pet owner's residence, shop, store, etc. by the pet. When the pet subsequently lies on a carpet or piece of furniture such as an upholstered chair, bed, sofa or the like, the fleas can move into the fabric of the carpet or furniture. Similarly, if the female flea has laid eggs in the fur of the pet, the eggs and/or hatched larva can be transferred from the pet to the fabric. When the pet's owner thereafter comes in contact with the carpet or furniture, he or she is bitten by the fleas.

Over the years much time and effort has been expended to rid residences and other buildings of flea infestation. Exterminators have used a wide variety of insecticides in water sprays and in powdered form to apply to carpet and furniture; Hamm, *The Handbook of Pest Control*, Part I (1982); Metcalf, "Insecticides in Pest Management," in Metcalf et al. (eds.), *Introduction to Insect Pest Management*, Ch. 7 (2nd Edn.: 1982). Of the principal active ingredients of these sprays and powders have been various types of adulticides and larvacides which kill fleas at one or more of the larva, juvenile or adult stages, and insect growth regulators, which when applied to larvae prevent the larvae from pupating and reaching an adult stage, thus halting the reproductive cycle; Cremlyn, *Agrochemicals*, Chs. 4, 6, and 14 (1991). These efforts have had varying degrees of success, but none has been found to be completely successful in providing universal extermination to a treated population. This lack of overall success has been due to the fact that fleas (and many other similar insects) pupate.

The four-stage life cycle of a flea is schematically illustrated in FIG. 1. During the adult phase the male and female fleas mate and the female lays eggs, which may be laid directly in carpeting, furniture fabrics, the fur of pets or similar locations. The eggs hatch into worm-like larvae. The larvae initially have an insect growth regulating hormone, the amount of which gradually diminishes in a larva over the length of the larval period. This progressive loss of hormone eventually triggers the beginning of pupation, in which the larva forms a cocoon or cuticle around itself, and within the cocoon becomes a pupa. Over a course of the pupation period thereafter the pupa is metamorphosed inside the cocoon into a juvenile flea, which essentially has the adult morphology but is immature. Within a short period of time, the juvenile matures into an adult flea. Both juveniles and adults can bite. (For brevity herein, the term "adult" will often be used to include both adults and juveniles, since for the purposes of this invention both are susceptible to adulticides.) Four-stage life cycles such as those of fleas are well known and have been widely described in the literature; Atkins, supra, Ch. 9; Evans, *Insect Biology: A Textbook of Entomology*, Ch. 4 (1984); Friedlander, *The Biology of Insects*, Ch. 3 (1976); Arms et al., *Biology*, pp. 501–502 (1979); Villee, *Biology*, pp. 205–208 (3rd Edn.: 1957); and Farb, *The Insects*, Ch. 3, (1962). For the purposes of this inveniton, oherein, the life cycle of the flea (and similar insects) is significant because during the pupation stage the fleas are substantially unaffected by any of the prior art methods used for flea extermination and control of flea infestations.

Therefore, when the adult fleas, eggs and larvae infest carpeting or furniture fabrics, the resulting pupa become lodged in those materials and locations. Application of water-based insecticidal sprays or insecticidal powders are normally sufficient to kill adult fleas, larvae and flea eggs, to the extent that the insecticides contact the targets, either directly during application or subsequently as residues. Many sprays and powders cannot, however, penetrate deeply into the weave of fabrics or the depth of carpet pile and therefore frequently do not contact eggs, fleas or larvae. Even those that do penetrate, however, will kill only eggs, fleas or larvae there, but will not affect the pupae in their cocoons, even by direct contact. Consequently, one normally finds that while a flea infestation appears to have been dealt with adequately immediately after an application of the spray or powder insecticides, within a short time thereafter the pupation phase of the unaffected pupa is completed and the location is again infested by newly hatched juvenile fleas and subsequently by adult fleas, follow which the entire cycle repeats.

It is known that pupa can remain dormant for extended periods of time, and that the end of pupation and opening of the cocoon is triggered by elevated levels of ambient humidity, temperature and pressure; Silverman et al., *Ann. Entomol. Soc. Am.*, 78:763–768 (1985); Rust et al., *J. Mod. Entomol.*, 26:301–305 (1989); Dryden, "Biology of Fleas on Dogs and Cats", 3rd UCR Urban Pest Mgmt. Conf. (Riverside, Calif.: Mar. 29, 1994). Applications of water-based insecticides and powdered insecticides do not markedly affect the humidity, temperature and pressure of the pupal cocoon environment, and therefore have no effect on causing the cocoons to open. Common events that might provide increases in humidity, temperature or pressure, such as steam cleaning of carpets or upholstery, often serve to increase flea infestation rather than decrease it, since steam cleaning causes many of the pupal cocoons to open, thus adding to the overall flea population. While there has been one prior art method incorporating a borate into steam, that has also been ineffective in eradicating juvenile and adult fleas. Borates are solely larvacides, so that when the steam/borate is applied, the larvae are killed, but the pupal cocoons are simultaneously stimulated to open, thus producing a new population of adult fleas which are unaffected by the borate. The new population of adult fleas seek an animal or human host and once again begin the life cycle.

Consequently, prior art methods for "exterminating" fleas and similar insects have been ineffective for long term pupa elimination, providing not complete extermination but at best merely periodic diminishing of flea populations. The populations, however, return as the flea life cycle continues and the resident pupae hatch to new fleas.

SUMMARY OF THE INVENTION

The invention herein provides a method, compositions and apparatus for causing the death of fleas at all stages of the flea life cycle. It not only provides for direct and residual insecticidal extermination of juvenile and adult fleas and flea larvae and flea eggs, but also provides the necessary substantial increases in humidity, temperature and pressure of the cocoon environment to force pupal cocoons to open within a relatively short period of time, so that the emerging juvenile fleas are killed by the insecticide residues remaining from the initial insecticidal application of the invention. These effects are obtained by the simultaneous application of at least one residual adulticide, at least one residual larvacide and high temperature water under pressure to the infested location. Thus, unlike prior art methods, the present method results in complete termination of a flea infestation, since not only are active fleas, eggs and larvae killed directly, but the heretofore immune pupal cocoons are also activated to open so that metamorphosed pupa can be killed by residual insecticide as juvenile fleas. Thus, within a few days following application of the present method all forms of fleas from all four life stages have been killed, thus completely terminating the infestation.

(For brevity herein, the application medium used in this invention will often be referred to as "hot water." As will be evident from the temperature ranges defined below, however, it will be evident that the actual medium is a mixture of high temperature water vapor and liquid water, with any entrained steam, in various proportions depending on the actual temperature profile of the mixture. For the purposes of this invention the exact amounts of liquid water, water vapor and any steam are not significant, since any mixture which creates the necessary ambient environment of elevated temperature, humidity and pressure will be satisfactory.)

In one embodiment, the invention is a method for extermination of pupating insects, including adult and emergent insects, larvae and eggs, which comprises providing hot water under pressure; mixing a residual insecticide combination comprising at least one adulticide and at least one larvacide into the hot water, the insecticide combination maintaining insecticidal properties during application and for a residual period of time thereafter; applying the mixture of hot water and insecticide combination under pressure to an infestation location where the pupating insects, including pupal cocoons of the insects, are present; and maintaining the application for a period of time sufficient to deliver a quantity of the larvacide and the adulticide sufficient to kill those of the larvae, eggs and adult insects with which they come into contact, both during the application and during the residual period of time, and create an environment around the cocoons of elevated ambient temperature, pressure and humidity to induce pupation within the cocoons to terminate, the cocoons to open and metamorphosed insects to emerge from the cocoons, within a period of time less than the residual period of time, such that the emergent insects contact residual quantities of the adulticide and are killed.

In another embodiment the invention is a composition for the extermination of pupating insects, including adult and emergent insects, larvae and eggs, which comprises hot water and a residual insecticide combination comprising at least one adulticide and at least one larvacide dispersed in the hot water.

In yet another embodiment, the invention is apparatus for extermination of pupating insects, including adult and emergent insects, larvae and eggs, which comprises a generator for providing hot water under pressure; a mixer for mixing an insecticide combination comprising at least one adulticide and at least one larvacide into the hot water, the insecticide combination maintaining insecticidal properties during application and for a residual period of time thereafter; an applicator for delivering the mixture of hot water and insecticide combination under pressure to an infestation location where the pupating insects, including pupal cocoons of the insects, are present; a conduit for delivering the mixture of hot water and insecticide combination under pressure to the applicator; and means for maintaining the delivery of the mixture of hot water and insecticide combination to the applicator and from applicator to the location for a period of time sufficient to deliver a quantity of the adulticide and the larvacide sufficient to kill those of the insects, eggs and larvae with which it comes in contact, both during the application and during the residual period of time; and create an environment around the cocoons of elevated ambient temperature, pressure and humidity, whereby pupation within the cocoons is induced to terminate, the cocoons are induced to open and metamorphosed insects are induced to emerge from the cocoons within a period of time less than the residual period of time, such that the emergent insects contact residual quantities of the adulticide and are killed.

Suitable insecticides include adulticides and larvacide may be inorganics, botanicals, organochlorides, organophosphates, carbamates, pyrethroids, growth inhibitors and chitin inhibitors. Preferred materials are permethrin, methoprene and fenoxycarb.

BRIEF DESCRIPTION OF THE DRAWINGS

FIG. 1 is a schematic representation of the four phases of the flea life cycle.

FIG. 2 is a schematic diagram illustrating application of the method and compositions of the present invention to cause penetration of carpeting to exterminate not only active fleas and larva but also cause the resident pupal cocoons to be opened and the emerging fleas to be exterminated.

FIG. 3 is a schematic diagram illustrating two embodiments of equipment which can be used to perform the present process.

FIG. 4 is a schematic diagram similar to that of FIG. 3 illustrating an alternative device for mixing insecticide and hot water.

DETAILED DESCRIPTION AND PREFERRED EMBODIMENTS

In the discussion below, the method, compositions and apparatus of the present invention will be described in the context of eliminating flea infestation of a piece of carpeting. It will be understood of course that this represents merely an example, and that the present invention is equally applicable for eliminating infestations of fleas in many types of fabric, carpeting and other materials, as well as in recesses in furniture, building structures and other enclosed areas where such insects and their pupae are likely to be found. Thus, for instance, one could use the present method not only on carpeting but also in corners of the rooms of a house, in crawl spaces, cupboards and many other areas within a residence, office, store, shop or other enclosed area. Similarly, it will also be understood that while the invention is exemplified by discussing an infestation of fleas, the same principles will apply to extermination of other pupating insects whose pupae have proved resistant to prior art methods of extermination. Such other insects which go through a pupation stage include many species of moths, flies and bees. However, it will also be recognized that because of the persistent nature of typical flea infestations, and the fact that these are common and wide spread in many residences and other buildings because of the presence of resident (pet or stray) cats and dogs, a most important and critical use of the present invention is for the control and extermination of flea populations.

The invention is best understood by reference to the drawings. Considering first FIG. 2, a small section of carpeting 2 is represented schematically. The carpeting 2 is formed of a carpet base 4 and strands of material 6 forming the carpet pile 7. At many points throughout the carpet pile 7 are found large populations of flea larvae 10 and eggs 11, with a significant number of live juvenile and adult fleas 8. Also within the carpet pile 7, often deeply imbedded, are flea pupal cocoons 12. As noted, prior art extermination methods have been ineffective in wholly eliminating flea infestations, since many of the liquid and powder insecticides cannot penetrate into the carpet pile 7, particularly in those types of carpeting with thick or densely packed pile strands 6, so that the deep recesses are never reached. However, even those which do penetrate sufficiently deeply to reach the pupal cocoons 12, or which contact pupal cocoons 12 which are less deeply located within the carpet pile 7, do not have any effect on the pupae. The pupae remain alive within the cocoons and capable of emerging in due course to spawn a new generation of fleas.

The present invention combines the penetrating and environment-changing capabilities of hot water with the biocidal capabilities of insecticides, including larvacides and adulticides, which have residual effectiveness. (As used herein, "insecticide" will be used as the collective term for the required combination of at least one each of a larvacide and an adulticide. "Residual" means that the material not only kills upon application but also retains a significant residual killing ability for some time period following application, as discussed below.) The resultant compositions penetrate throughout deeply set piles or heavily woven fabrics to reach all pupal cocoons, eggs, larvae and adult fleas to kill immediately or by residual action those eggs, larvae and adults which are contacted. By increasing the temperature, pressure and humidity of the cocoon environments, they also cause the cocoons to open and the metamorphosed pupae to emerge, and then by the residual action of the insecticides, kill the emerging new generation of fleas. Thus, within a few days following the completion of an application of the process of the present invention, all forms of fleas at all stages of their life cycle, including those which were in the pupa stage at the time of application of the process, have been killed, so that the flea infestation is fully terminated.

FIG. 3 illustrates a typical piece of equipment which can be used for conducting the present process. A hot water generator 14 boils water to form wet steam which condenses as hot water under pressure and at a temperature typically of about 170° F. (77° C.). The hot water generator may be mounted for transport and use in a vehicle 16 in a manner similar to the vehicles and equipment used by carpet cleaning services, or the generator may be a small portable unit, conveniently mounted on wheels 18, which can be rolled into the various rooms of offices or residences. The pressure generated may be sufficient to convey the hot water to the applicator 28 with the desired application pressure and temperature, or a pump (not shown) may be used to supplement the flow. In the mobile vehicle the generation equipment and distribution pump are normally powered by the vehicle's motor and electrical generation system, while in the self-contained unit the power for the generator and pump is normally obtained by plugging into a normal electrical outlet through cord 20. Hot water generated by generator 14 is transported to the application site through a hose or similar conduit 22, usually under the force of a conventional pump (not shown).

Accompanying and preferably attached to the hot water generator 14 is a reservoir 24 to contain the insecticide composition. Normally this will be in the form of an aqueous solution or suspension of any of a wide variety of residual adulticides and larvacides (which will be described in more detail below). The residual insecticide compounds (i.e., at least one adulticide and at least one larvacide) may be in any convenient form prior to being placed in the reservoir. Typically insecticide compounds are supplied from vendors as soluble granules, powders, flakes or other comminuted forms, as concentrated aqueous solutions or suspensions, or as emulsifiable concentrates. The insecticide is dissolved, suspended or diluted by the water in the reservoir. The resulting insecticide solution/suspension will be drawn out of reservoir 24 through hose or other conduit 26. It may be drawn out by aspiration through contact with a typical injector mechanism for the hot water supply (see FIG. 4) or may be pumped to be mixed with the hot water in the applicator by its own pump within the reservoir 24, which will normally also receive power from the vehicle power system or through cord 20.

The insecticide and hot water are mixed at applicator 28, either within the applicator itself or immediately before injection into the applicator 28. In the embodiment shown in FIG. 3 the mixing occurs within the applicator's interior chamber 30 as the hot water entering the chamber 30 under pressure in spray form creates a region of turbulence in which it contacts and forms an intimate mixture with the liquid insecticide coming from the insecticide reservoir 24, as shown at 32. The inner surfaces of the interior applicator 28 will conveniently be configured to maximize the mixing of the insecticide and hot water. Numerous such mixing chambers and the applicable parameters for baffles, surface configurations or the like to create the desired flow and mixing patterns are well known and will be readily understood by those skilled in the art; see, for instance, Perry et al. (eds.), *Chemical Engineers' Handbook*, Chs. 18 and 21 (5th Edn.: 1973). Similarly, in the embodiment shown in FIG. 4, the insecticide solution is aspirated into and mixed with the hot water flow stream through an injector 34. Those skilled in the art will readily be able to determine the correct sizing and design of the of such aspirators or injectors from well known prior art description of such units; Perry et al., supra, Chs. 18 and 21.

In operation the device shown in FIGS. 3 and 4 is operated in a manner substantially similar in that used for conventional hot water cleaning of carpets or upholstery. Hot water under elevated temperature and pressure is generated and mixed with aqueous insecticide such that upon spray application the temperature of the combination is in the range of 150°–200° F. (66°–93° C.) and under sufficient pressure to penetrate completely into a carpet pile 7 or similar closely woven fabric. The resulting vapor-liquid combination saturates the environment within the carpet pile 7, creating a relative humidity of at least 50%. The resulting elevated temperature, pressure and humidity forms environmental conditions within the carpet pile that stimulate all of the flea pupal cocoons to complete metamorphosis of the pupae and open to hatch new juvenile fleas. Because of the nature of the metamorphosis process, some flea pupal cocoons often open promptly during the actual application of the hot water/ liquid insecticide composition, such that the emerging fleas are killed on contact when the resident adult fleas, eggs and larvae are also simultaneously killed. Other cocoons, however, while stimulated to begin an expedited opening process, may not complete opening and hatching of the fleas for a period of a few days. The insecticide chosen for use in the process will be one which leaves residual active material 36 within the carpet pile, usually in the form of a film or coating on the pile fibers 6 or in the form of solid material which crystallizes as the liquid carrier evaporates. In either case the residual adulticide component of the insecticide material will be sufficiently active to kill any fleas with which it comes in contact, either by direct contact or through any vapors which it may emit. The residual effectiveness will last sufficiently long to extend over a period well beyond the opening and emerging time of the last pupal cocoons to be affected by the increased pressure, temperature and humidity of the application process, so that extermination of all newly hatched fleas can be assured and no remaining unopened cocoons with viable pupae will be present. Typical useful insecticides may have residual period of 3 days to 18 months; for instance, insect growth regulators typically are residually effective for 7–18 months, while permethrin is residually effective for 3–30 days.

The various exterminating compounds used in the present invention can be any of a variety of different kinds of effective insecticides, including insect growth regulators to affect the larvae and prevent them from reaching the pupa or adult stage, chitin inhibitors which prevent larvae from forming the exoskeleton of adult fleas, or adulticides and larvacides. A wide variety of such materials are described in Van Valkenburg, *Pesticide Formulation*, (1973) [see particularly Wilkinson, "Correlation of Biological Activity with Chemical Structure and Physical Properties" and Polon, "Formulation of Pesticidal Dusts, Wettable Powders and Granules", Ch. 1 and 5 respectively of the Van Valkenburg text]; Hamm, supra, Part II, pp. 140–142; Metcalf, supra, Ch. 7 (Appendix); Cremlyn, supra; Friedlander, supra, Ch. 6; Atkins, supra, Ch. 23; and Evans, supra, pp. 404–407. The various types of insecticides include inorganics, botanicals, organochlorides, organophosphates, carbamates, pyrethroids and growth and chitin inhibitors. Typical individual materials include boric acid and its borate salts, the natural botanical pyrethrins from *Chrysanthemum cinerariafolium* and their synthetic derivative allethrin; methoprene [isopropyl 11-methoxy-3,7,11 -trimethyl-dodeca-trans-2,trans-4-dienoate]; permethrin [3-phenoxybenzyl d,l-cis,trans-3-(2, 2-dichlorovinyl)-2,2-dimethyl-cyclopropane-1-carboxylate]; cypermethrin [(±)α-cyano-(3-phenoxyphenyl)methyl-(±)-cis,trans,-e-(2,2 -dichloroethenyl)-2,2-dimethyl-cyclopropanecarboxylate]; methiocarb {4 -methylthio-3,5-xylyl-N-methylcarbamate]; malathion[[(dimethoxyphosphinothioyl)thio] butanedioic acid diethyl ester]; fenvalerate [cyano-(3-phenoxy phenyl) methyl-4-chloro-α-(1-methylethyl)benzeneacetate;cyfluthrin[cyano-( 4-fluoro-3-phen-oxyphenyl)methyl-(3-dichloroethenyl)-2,2-dimethylcyclopropanecarboxylate]; diflubenzuron [N-(2,6-difluoro-benzoyl)-4'-chlorophenyl urea]; decamethrin[α-cyano-3-phen-oxybenzyl-2-(p-chlorophenyl)-3-methylbutyrate]; fenoxycarb[ethyl-2-(p-phenoxyphenoxy)-ethylcarbamate]; carbaryl[1-naphthyl-N-methylcarbamate]; and rotenone[1,2,12,12a-tetrahydro- 8,9-dimethoxy-2-(1-methylethenyl)-[1]benzo-pyrano[3,4-b]-furo[2,3-h] [1]-benzo-pyrano-6(6aH)-one; also known as derrin, tubatoxin or nicouline]. Preferred materials are permethrin, methoprene and fenoxycarb. Numerous other suitable compounds are described in the above mentioned texts. Those skilled in the art will have no difficulty selecting the combination of materials for any given infestation problem. The user will of course make such selection with due regard to all applicable governmental safety and environmental regulations pertaining to insecticides. Preferably one will select a combination of materials which will have the maximum toxicity to the insects consistent with minimal hazard to the humans, pets, and other animals.

It is also common for insecticide compositions to include synergists to enhance the effects of the insecticides or overcome insect resistance to certain insecticides. Typical synergists include piperonyl butoxide, triphenyl phosphate, tributyl phosphorotrithioate, and several dibutylcarbamates; see Cremlyn, supra, pp. 154–155.

It will also be advantageous to incorporate emulsifiers and surface active agents into the hot water/insecticide mixture, to maintain the insecticide properly disbursed through the hot water system and also to improve the wetting and therefore penetration of the hot water/insecticide into and through the depth of carpet pile and fabrics. Typical emulsifiers and surface active agents are described in many sources, including Betcher, "The Emulsifier" and Van Valkenberg, "The Stability of Emulsions", Chapters 2 and 3 respectively, of the aforementioned Van Valkenberg text; Cremlyn, supra, Ch. 2; Atkins, supra, p. 383; and Evans, supra, pp. 406–408. Similarly, materials such as deodorizers can also be present.

The method of the present invention has been successfully applied in controlled tests, in which samples of carpeting were deliberately infested with adult fleas, larvae and pupae. Flea eggs were not introduced since it is difficult to determine their mortality. Specific examples are set forth below. As will be seen, the tests were run with applications for various times and with different insecticides, and the results were quantitatively determined by microscopic examination of the treated carpet samples. With initial hot water pressures from the hot water generators in the range of 40–110 psi (275–760 kPa), application times of 0.1–2 minutes were found quite adequate to result in substantially complete extermination during the application and including the following time period of three to fourteen days for opening of all of the pupa and extermination of the emerging juvenile fleas. Insecticide concentrations of 0.06–1.1 percent (all percentages are by weight unless otherwise stated) in a water solution were found to be entirely adequate. It will be recognized by those skilled in the art that the optimum concentration of any given insecticide or combination of insecticides will vary, but substantially all will be in this same general range and those skilled in the art can readily determine the optimum concentration for any particular combination without undue experimentation. For instance, in the above cited experiments, concentrations of 0.0625–0.187% of fenoxycarb, 0.50–0.7% of permethrin and 0.09–1.1% of methoprene were all found to be effective. For further materials, reference may be made to the above cited texts and numerous other sources of known chemical property and concentration data available widely for insecticides, particularly for those insecticides available in the commercial marketplace.

EXAMPLE 1

Twenty-five 4"×4" (10×10 cm) squares of carpet of varying density and pile were each infested with 20 flea larvae, 20 flea pupae cocoons and 20 adult fleas along with 0.02 g of dried bovine blood to sustain life. The test samples were subjected to injection with pressurized hot water at 170° F. (77° C.) with no additives until the carpet was lightly damp. The control samples were left untreated. Both test and control samples were then placed on beds of 50 g of sand and sealed in plastic dishes to prevent desiccation. The samples were then examined through a stereo microscope at 8, 24 and 48 hours following treating, from which the data of Table 1 were obtained.

TABLE 1

Hot Water Application

| Interval | Larvae Mortality, Percent | Pupae Emergence, Percent | Adult Mortality, Percent | Average Number of Live Adults Present |
|---|---|---|---|---|
| 8 hours: | | | | |
| Test Samples | 100 | 75 | 100* | 15 |
| Control Samples | 5 | 5 | 0 | 20 |
| 24 hours: | | | | |
| Test Samples | 100 | 95 | 100* | 19 |
| Control Samples | 10 | 5 | 0 | 20 |
| 48 hours: | | | | |
| Test Samples | 100 | 100 | 100* | 20 |
| Control Samples | 5 | 5 | 0 | 20 |

*In the 8 hours analysis, 20 dead adults were counted (100% of the original population) and 15 adults were alive. After 24 hours, there were 20 dead and 19 live adults. After 48 hours, there were 20 deal and 20 live adults.

After two weeks, 20 larvae, 20 pupae and 20 adults were reintroduced into the test samples. All instars (all stages) survived for 48 hours as anticipated, since there was no residual insecticide in the test samples.

The example shows that hot water application alone causes initial deaths of some fleas, but also stimulates the emergence of new fleas from the pupae, so that after only two days the renewed infestation of the test samples is as great as that of the untreated control samples.

EXAMPLE 2

The same procedure as in Example 1 was followed, except that the water used was at ambient temperature and also contained 0.58% of permethrin and 0.09% of methoprene. The test compositions were applied using an aerosol mist spray bottle in a manner simulating conventional prior art application techniques used by commercial exterminators. The test results are presented in Table 2.

TABLE 2

Ambient Water/Permethrin/Methoprene Application

| Interval | Larvae Mortality, Percent | Pupae Emergence, Percent | Adult Mortality, Percent | Average Number of Live Adults Present |
|---|---|---|---|---|
| 8 hours: | | | | |
| Test Samples | 100 | 10 | 110* | 0 |
| Control | 0 | 5 | 5 | 20 |

TABLE 2-continued

Ambient Water/Permethrin/Methoprene Application

| Interval | Larvae Mortality, Percent | Pupae Emergence, Percent | Adult Mortality, Percent | Average Number of Live Adults Present |
|---|---|---|---|---|
| Samples | | | | |
| 24 hours: | | | | |
| Test Samples | 100 | 10 | 110* | 0 |
| Control Samples | 5 | 5 | 5 | 20 |
| 48 hours: | | | | |
| Test Samples | 100 | 15 | 115* | 0 |
| Control Samples | 5 | 15 | 10 | 21 |

*The percentage of adult mortality is greater that 100% because it includes the mortality of emergent adult fleas as well as the mortality of the initially introduced adult fleas.

These data show that convention aqueous spray application of insecticides, without the simultaneous presence of elevated temperature and pressure, is not effective to end the infestation. The pupal cocoons are not substantially stimulated to open, so the pupae do not then emerge as adult fleas to be killed. While it can be anticipated that some of the subsequently emergent fleas may encounter residual amounts of the applied insecticides and be killed, much of the effectiveness of the insecticides will have diminished by the time that the normal pupation period ends, so that numerous emergent adult fleas will survive to breed and continue the infestation.

EXAMPLE 3

The same procedure as in Example 1 was followed, except that the hot water also contained 0.58% of permethrin and 0.09% of methoprene. The test results are presented in Table 3.

TABLE 3

Hot Water/Permethrin/Methoprene Application

| Interval | Larvae Mortality, Percent | Pupae Emergence, Percent | Adult Mortality, Percent | Average Number of Live Adults Present |
|---|---|---|---|---|
| 8 hours | | | | |
| Test Samples | 100 | 80 | 180* | 0 |
| Control Samples | 5 | 10 | 0 | 30 |
| 24 hours: | | | | |
| Test Samples | 100 | 100 | 200* | 0 |
| Control Samples | 5 | 15 | 0 | 23 |
| 48 hours: | | | | |
| Test Samples | 100 | 100 | 200* | 0 |
| Control Samples | 5 | 15 | 0 | 23 |

*The percentage of adult mortality is greater that 100% because it includes the mortality of emergent adult fleas as well as the mortality of the initially introduced adult fleas.

These data, which represent the process of the present invention, show highly effective eradication of the fleas, both among the adults and larvae introduced and also among the fleas emerging by stimulation of the opening of the pupal cocoons. All of the fleas, both introduced and emergent, have been killed, thus terminating the infestation completely.

EXAMPLE 4

At monthly intervals over the subsequent twelve months, 20 larvae were introduced into the test samples from Example 3 to simulate reinfestation. Pupae and adults were not introduced because reinfestation occurs in large part by new eggs dropping into the carpet, usually from pets, yielding new larvae, pupae and adults from the hatching of the deposited eggs. Microscopic examination showed that 100% of the reintroduced larvae were killed by the residual effect of the methoprene (an insect growth inhibitor) over the first ten months, and that in the eleventh and twelfth month 95% of the reintroduced larvae were killed. These data illustrate the ability of the process and compositions of the present invention to maintain an infestation-free environment.

EXAMPLE 5

The procedures of Example 4 were followed, but with 0.0625% of fenoxycarb substituted for the methoprene. The tests were continued for a fifteen-month period, during which 100% of the reintroduced larvae were killed every month. The test was terminated after fifteen months. These data also show the effectiveness of the present invention.

EXAMPLE 6

The procedures of Examples 4 and 5 were followed with a 10% aqueous solution of sodium bicarbonate instead of water. No effect was seen on the action of the insecticides, although the sodium bicarbonate did function effectively as a carpet deodorizer.

EXAMPLE 7

The procedure of Example 6 was followed using a 10% aqueous solution of sodium lauryl sulfate instead of the sodium bicarbonate. No effect was seen on the action of the insecticides, although the sodium lauryl sulfate did function effectively as a surfactant, improving wetting by reducing carpet fiber surface tension, thus permitting deeper and more thorough carpet pile penetration of the hot water and the insecticides.

While the invention has been exemplified by the equipment shown schematically in FIGS. 3 and 4, it will be apparent that a wide variety of different types of hot water injection or extraction equipment can be used in the method of this invention. Typical are those hot water and hot water injection and/or extraction devices used to clean carpets, upholstery and draperies, including both portable and vehicle mounted units, and any similar device which can be adapted to provide mixing of the insecticide slurry and the hot water by chamber mixing as shown in FIG. 3 herein or injector mixing as shown in FIG. 4. Those skilled in the art will be readily able to identify numerous types of equipment suitable for use in the present invention.

It will be evident that there are numerous embodiments of the present invention which, while not expressly described above, are clearly within the scope and spirit of the present invention. The above description is therefore to be considered exemplary only, and the actual scope of the invention is to be limited solely by the appended claims.

I claim:

1. A method for extermination of pupating insects, including adult and emergent insects, larvae and eggs, which comprises:
    a. providing hot water under pressure;
    b. mixing a residual insecticide combination comprising at least one adulticide and at least one larvacide into said hot water, said insecticide combination maintaining insecticidal properties during application and for a residual period of time thereafter;
    c. applying the mixture of hot water and insecticide combination under pressure to an infestation location where said pupating insects, including pupal cocoons of said insects, are present; and
    d. maintaining said application for a period of time sufficient to:
        i. deliver a quantity of said larvacide and said adulticide sufficient to kill those of said larvae, eggs and adult insects with which they come into contact, both during said application and during said residual period of time; and
        ii. create an environment around said cocoons of elevated ambient temperature, pressure and humidity to induce pupation within said cocoons to terminate, said cocoons to open and metamorphosed insects to emerge from said cocoons, within a period of time less than said residual period of time, such that said emergent insects contact residual quantities of said adulticide and are killed.

2. A method as in claim 1 wherein said pupating insects are species of fleas, moths, flies or bees.

3. A method as in claim 2 wherein said pupating insects are species of fleas.

4. A method as in claim 1 wherein said hot water is first provided to an applicator and applied to said location from said applicator, said mixing with said insecticide combination occurring prior to said application to said location from said applicator.

5. A method as in claim 4 wherein said mixing occurs within said applicator.

6. A method as in claim 4 wherein said mixing occurs prior to said hot water reaching said applicator.

7. A method as in claim 6 wherein said mixing comprises injecting said insecticide combination into said hot water through an aspirator or injector.

8. A method as in claim 1 wherein said adulticide and said larvacide are selected from the group consisting of inorganics, botanicals, organochlorides, organophosphates, carbamates, pyrethroids, growth inhibitors and chitin inhibitors.

9. A method as in claim 1 wherein said insecticide combination is in the form of an aqueous solution or suspension of said adulticide and said larvacide.

10. A method as in claim 9 wherein said adulticide and said larvacide are selected from the group consisting of inorganics, botanicals, organochlorides, organophosphates, carbamates, pyrethroids, growth inhibitors and chitin inhibitors.

11. A method as in claim 10 wherein said adulticide comprises permethrin and said larvacide comprises methoprene or fenoxycarb.

12. A method as in claim 11 wherein said adulticide comprises 0.5–0.7% of permethrin and said larvacide comprises 0.09–1.1% of methoprene or 0.0625–0.187% of fenoxycarb.

13. A method as in claim 12 wherein said adulticide and said larvacide comprise 0.58% of permethrin and 0.09% of methoprene.

14. A method as in claim 10 wherein said aqueous solution or suspension further comprises at least one other compound selected from the group consisting of synergists, emulsifiers and surface active agents.

15. A composition for the extermination of pupating insects, including adult and emergent insects, larvae and eggs, which comprises hot water and a residual insecticide combination comprising at least one adulticide and at least one larvacide dispersed in said hot water, said insecticide combination being present in an amount sufficient to kill those of said insects, larvae and eggs with which it comes in contact upon application and during a residual period of time following said application, said composition further adapted to create an environment around pupal cocoons of said insects of elevated ambient temperature, pressure and humidity to induce pupation within said cocoons to terminate, said cocoons to open and metamorphosed insects to emerge from said cocoons, within a period of time less than said residual period of time, such that said emerging insects contact residual quantities of said adulticide and are killed.

16. A composition as in claim 15 wherein said adulticide and said larvacide are selected from the group consisting of inorganics, botanicals, organochlorides, organophosphates, carbamates, pyrethroids, growth inhibitors and chitin inhibitors.

17. A composition as in claim 16 wherein said adulticide comprises permethrin and said larvacide comprises methoprene or fenoxycarb.

18. A composition as in claim 18 wherein said adulticide comprises 0.5–0.7% of permethrin and said larvacide comprises 0.09–1.1% of methoprene or 0.0625–0.187% of fenoxycarb.

19. A composition as in claim 18 wherein said adulticide and said larvacide comprise 0.58% of permethrin and 0.09% of methoprene.

20. A composition as in claim 16 further comprising at least one compound selected from the group consisting of synergists, emulsifiers and surface active agents.

21. Apparatus for extermination of pupating insects, including adult and emergent insects, larvae and eggs, which comprises:

a generator for providing hot water under pressure;

a mixer for mixing an insecticide combination comprising at least one adulticide and at least one larvacide into said hot water, said insecticide combination maintaining insecticidal properties during application and for a residual period of time thereafter;

an applicator for delivering said mixture of hot water and insecticide combination under pressure to an infestation location where said pupating insects, including pupal cocoons of said insects, are present;

a conduit for delivering said mixture of hot water and insecticide combination under pressure to said applicator; and means for maintaining said delivery of said mixture of hot water and insecticide combination to said applicator and from applicator to said location for a period of time sufficient to deliver a quantity of said adulticide and said larvacide sufficient to kill those of said insects, eggs and larvae with which it comes in contact, both during said application and during said residual period of time; and create an environment around said cocoons of elevated ambient temperature, pressure and humidity, whereby pupation within said cocoons is induced to terminate, said cocoons are induced to open and metamorphosed insects are induced to emerge from said cocoons within a period of time less than said residual period of time, such that said emergent insects contact residual quantities of said adulticide and are killed.

22. Apparatus as in claim 21 wherein said hot water generator and a reservoir for said insecticide combination prior to mixing are housed in a single device.

23. Apparatus as in claim 22 wherein said device is portable.

24. Apparatus as in claim 22 is transported in a vehicle.

25. Apparatus as in claim 21 wherein said mixer comprises a chamber within said applicator wherein said hot water and said insecticide combination are contacted and mixed, with said mixing occurring within said chamber prior to said application of said mixture to said infestation location from said applicator.

26. Apparatus as in claim 25 wherein said mixer comprises a mixing device which incorporates said insecticide combination into said hot water prior to said applicator.

27. Apparatus as in claim 26 wherein said mixing device comprises an aspirator or injector.

\* \* \* \* \*